United States Patent Office 3,834,914
Patented Sept. 10, 1974

3,834,914
REFRACTORY RAMMING MIX
Joseph E. Neely, Los Gatos, and Nicholas Cassens, Jr.,
Pleasanton, Calif., assignors to Kaiser Aluminum &
Chemical Corporation, Oakland, Calif.
No Drawing. Filed Mar. 7, 1973, Ser. No. 338,934
Int. Cl. C04b 35/04, 35/12
U.S. Cl. 106—59       13 Claims

ABSTRACT OF THE DISCLOSURE

A sodium silicate bonded, MgO-containing, prepared refractory ramming mix is made from prereacted chrome-periclase or periclase-chrome grain, a soluble boron compound, a water retention agent, sodium silicate, and water. Chrome ore may be substituted for the prereacted grain, and the composition may contain up to 10% periclase grain. The boron compound and water retention agent are mixed dry with the refractory grain, and water subsequently added. After the water is distributed throughout the boron compound and water retention agent coating the grain, sodium silicate is added. The particular method of mixing produces a product which can be stored for relatively long periods of time without setting.

BACKGROUND OF THE INVENTION

This invention concerns prepared refractory ramming compositions, particularly such compositions containing MgO.

Prepared or ready-to-use refractory mixes are well known and have the characteristic that they can be formed by the user without addition of water or other tempering substance. They are used to form monolithic sections of furnaces and other refractory structures (e.g., to patch a hole in a furnace) or to form an irregular portion, such as the delta section of an electric arc furnace roof.

Various types of prepared refractory mixes are known. For example, fireclay plastics have been used for many years and consist essentially of fireclay mixed with sufficient water to render the material plastic. Sometimes an air setting bond such as aluminum sulfate or sodium silicate is included. Prepared refractory mixes have also been made from such nonplastic materials as chrome ore by the addition of a plasticizer, for example clay, and a bond such as sodium silicate, for example as set forth in U.S. Pats. 2,792,311, 3,297,458, and 3,406,029.

However, heretofore it has proven impractical to make a prepared refractory mix bonded with sodium silicate which contains significant amounts of MgO, for example over 20%, particularly when the mix contains uncombined MgO, for example in the form of periclase grain. This is because the MgO, particularly if it is of small particle size, tends to react with the water in the prepared mix to form magnesium hydroxide, causing the sodium silicate to set. This setting reaction tends to make the prepared refractory a hard, unworkable mass after a relatively short period of storage, perhaps as short as a few days, but in any case within a few weeks. For practical storage and distribution of a prepared refractory mix, it must last for at least 3 months, and preferably 6 months, without setting.

In discussing the MgO content of a refractory mix, one must distinguish two types of MgO. Combined MgO is that which is present, for example, in chrome ore and in prereacted chrome-periclase or periclase-chrome grain. So-called "free" MgO is that which is present in essentially uncombined form, for example as periclase grain. The latter type of MgO, particularly in finer grain sizes, is the more troublesome as far as hydration goes.

The problem of storing a prepared refractory mix containing MgO, sodium silicate, and water has two aspects. The first is the problem of evaporation of the water. This problem is present in fireclay plastics and chrome ore plastics, and has generally been solved by packing the prepared mix in moisture-proof bags. It will be evident that similar packaging will be required for storage and shipping of the composition of the present invention. The other aspect of the premature setting problem, which occurs when MgO is present in the prepared mix, is due to hydration of the MgO to magnesium hydroxide, thus removing water from the sodium silicate and causing it to set. It is this second aspect of the problem to which the present invention is particularly directed.

SUMMARY OF THE INVENTION

It has been found, according to this invention, that a prepared MgO-containing refractory mix which can be stored for at least three months without setting can be made from a composition consisting essentially of: (1) from 84 to 94% refractory grain containing over 20% MgO, not over 10% of the batch being MgO in uncombined form, the remainder being present in prereacted chrome-periclase or periclase-chrome grain or chrome ore; (2) from 0.1 to 1%, on the $B_2O_3$ basis, of a water-soluble boron compound; (3) from 0.1 to 0.5% of a water retention agent; (4) from 1 to 5% sodium silicate; and (5) from 4 to 8% water; all percentages being by weight based on the total weight of the composition including water.

The method of mixing the ingredients has been found to be particularly important in achieving maximum storage life without setting. Briefly, preparation of the material is carried out in the following order: (1) mixing together the refractory grain, boron compound, and water retention agent; (2) adding the water to the admixture of step (1); (3) mixing until the admixture has a stiff plastic consistency; (4) adding the sodium silicate to the mix prepared in step (3); and (5) mixing until the batch becomes a wet granular mix.

DETAILED DESCRIPTION

The grain used in the preferred practice of this invention is a prereacted periclase-chrome or chrome-periclase grain containing at least 20%, and up to 80%, MgO. Such prereacted grains are well known in this art, and are made by admixing chrome ore and magnesia, or a magnesia-yielding material such as magnesium hydroxide, in selected proportions to obtain the total MgO content desired in the fired grain. After mixing, and perhaps compaction, the raw materials are fired, often at temperatures above 1950° C., to form the prereacted grain. It is preferred that the prereacted grain used in this invention be made from very finely divided raw materials so that there will be substantially complete reaction between the raw materials during firing, the grain then being free of residual chrome raw material. A particularly preferred prereacted grain is one made from approximately equal weight proportions of magnesia and Masinloc chrome ore concentrates, the fired grain containing about 60% MgO. The use of chrome concentrates is preferred because of the desire to minimize the amount of silica in these refractories.

Some or nearly all of the prereacted grain can be replaced by chrome ore, either raw or in the form of beneficiated concentrates. However, it will be appreciated that the benefits of the present invention are most apparent with compositions containing higher amounts of MgO. Depending on their source, chrome ores contain from about 10 to about 20% MgO. Thus, compositions according to the present invention will contain over 20% MgO. The upper limit on the amount of MgO which mixes according to this invention can contain has not been precisely determined, but successful mixes have been made containing 60% MgO in the form of prereacted grain plus 10% uncombined MgO in the form of periclase grain, as described more fully below. On the other hand, a composition made from a prereacted grain containing 90% MgO did not exhibit the desired storage properties of compositions according to this invention.

The mix of this invention may contain up to 10% uncombined MgO, for example in the form of periclase or as dolomitic materials such as dolomite grain. The exact amount of free MgO which can be tolerated will depend on the particle size of the material since, as is well known, finer particles of periclase, for example, hydrate more rapidly. Thus, when the free MgO material all passes a 100 mesh screen, the amount should be limited to 5% of the total composition, whereas when material coarser than 100 mesh is used, up to 10% can be tolerated. The inclusion of unreacted MgO grain in the compositions of this invention offers no particular advantage, but when these mixes are manufactured in a plant where periclase is also manufactured and used, a certain amount of periclase contamination is probably unavoidable. Accordingly, the composition of this invention is designed to have the desired nonsetting properties despite some contamination with uncombined MgO.

It should be noted that although a certain amount of uncombined MgO can be tolerated in the grain used in making the present composition, it is essential that the prepared mix, after being made, be protected from further contamination with free MgO, since addition of that material after the mix has been made will cause premature setting.

The refractory grain will be sized according to known principles to secure maximum density upon packing. For example, it will substantially all pass a 4 mesh screen and range in size down to material passing a 325 mesh screen.

The boron compound may be any such material which is soluble in the water. However, for reasons of economy and ready availability, sodium borate compounds will generally be preferred. It has been found that the use of a fully hydrated borate, for example borax, leads to longer storage life in the mix. Boric acid can be used, but it has been found that the use of this material leads to faster setting of the mix in storage than the use of a material such as borax. In order to discuss different boron compounds on a comparable basis, the amount of $B_2O_3$ in the boron addition is referred to.

The water retention agent may be any of several well known materials, methyl cellulose (e.g., the material sold by Dow Chemical Company under the trade name Methocel) being a preferred water retention agent. Organic materials are preferred since they tend to burn out during firing of the mass, leaving no undesirable residue.

The sodium silicate binder may be any of various sodium silicates available, these materials differing mainly in the relative amounts of $Na_2O$ and $SiO_2$ they contain. As is well known, the higher $SiO_2$ sodium silicates tend to be more refractory, while those with relatively more $Na_2O$ tend to be more readily soluble. A particularly suitable sodium silicate is one containing two parts by weight of $SiO_2$ for each part by weight $Na_2O$ (e.g., the sodium silicate sold by Philadelphia Quartz Company under the brand name "GD").

It has been found that, in order to obtain maximum storage life, the order of mixing the ingredients is particularly important. Best results have been obtained when the dry grain, boron compound, and water retention agent are first mixed together dry, e.g., for two minutes. The water is then added, and mixed with the dry ingredients until the mix becomes a stiff, coherent plastic mass. This has been found to take about two minutes. During this mixing, the water retention agent and boron compound form a coating on the refractory grain. Finally, the sodium silicate is added, and mixed with the other ingredients until the batch appears wet and becomes granular. It has been found that this last mixing takes about three minutes. It is very important that the third mixing step not be continued too long, as the mix appears to get wetter and wetter and loses its granular characteristics. Overmixing in the third step leads to premature setting.

It will be understood that the mixing times required to reach the specified consistencies may vary with the type of mixing equipment used and the size of the batch. However, the times to reach the specified consistencies can be determined readily for any given equipment and batch size.

The result of this mixing procedure is that the refractory grain is coated with two layers of material. The inner layer is an admixture of the boron compound and the water retention agent, while the outer layer is the sodium silicate. The water is distributed in these two layers, but it is believed most of it is in the inner layer. In fact, it is believed that over-mixing in the third step, referred to above, results in too much of the water being taken up by the sodium silicate layer. It is believed this coating structure, wherein the sodium silicate is separated from the MgO-containing grain by the inner layer of water retention agent and boron compound, prevents reaction between the MgO and the water in the sodium silicate layer, thus preventing premature setting.

It will be evident that the present invention solves the problem of making a prepared, MgO-containing, sodium silicate bonded refractory mix by two expedients: First, the bulk of the MgO is present in the mix in combined form, specifically in the prereacted grain. Second, the problem of the presence of any inadvertent or "tramp" MgO present, for example as periclase grain contamination, is solved by coating the grain with a layer of boron compound and water retention agent before adding the sodium silicate, thus impeding removal of water from the sodium silicate by the MgO. It will be evident that this particular coating structure also impedes any tendency toward reaction between water and combined MgO in the prereacted grain.

While the composition can be formed into a monolithic shape immediately after it has been made, it has been found that better densities are obtained if the mix is stored for at least a week before forming.

EXAMPLE 96.2 parts of a prereacted periclase-chrome grain, made by firing finely divided Masinloc chrome concentrates and sea water magnesium hydroxide at a temperature of about 2000° C. to produce a grain containing 60% MgO, were mixed with 0.5 part borax and 0.3 part Methocel 65 HG for two minutes. The borax was in the form of granules 90% of which were +100 mesh, the Methocel was in the form of a fine powder, and the prereacted grain ranged in size from 4 mesh down to about 20% passing a 325 mesh screen. After the first mixing period, six parts water were added and the material mixed for a further two minutes. At this stage, the mix was a very stiff plastic coherent mass which formed a single lump in the Muller mixer. Finally, three parts of GD brand sodium silicate, in the form of a spray dried powder 80% of which was —100 mesh, were added and mixed for three minutes, at which point the mix appeared wet and was granular and free flowing.

A similar mix, but with five parts of the —100 mesh prereacted grain replaced by five parts of —100 mesh periclase grain containing 98% MgO, was made in exactly the same way. Both compositions were stored in plastic sacks for three months. After such storage, both were in very good condition, containing soft lumps which could be broken very easily by hand. At this stage in their storage, parts of the compositions were removed and rammed. The first mix, containing no periclase, had a rammed density of 189 pounds per cubic foot (p.c.f.), whereas the periclase-containing mix had a rammed density of 183 p.c.f. The first mix had a density of 180 p.c.f. after drying at 150° C.

After firing to 1650° C. it had the following properties: 179 p.c.f. density, 0% linear change, 0.6% volume shrinkage, 1.4% weight loss, and 2452 pounds per square inch (p.s.i.) cold crushing strength.

The two preceding mixes were stored for a further month for a total of 4 months storage, after which time they were still suitable for forming.

Two mixes identical to the foregoing, except that boric acid was used in place of borax, the mixes being made in exactly the same way, were also stored for three months, after which time they were in good condition for use as a refractory ramming mix. However, three months was the end of their practical storage life.

The periclase-free boric acid mix just described may be compared with a mix of identical composition but made by adding the boric acid and water as a slurry to the dry mixture of prereacted grain and Methocel, the sodium silicate being added later. Both boric acid mixes appeared identical immediately after mixing. However, the mix with the boric acid added as a water slurry had set to a solid lump after two weeks storage, whereas, as described above, the mix where the boric acid was added dry in the initial mixing of grain and Methocel was still free flowing after three months storage. This comparison illustrates the necessity of following the specified mixing procedure in order to obtain the desired storage life.

In the specification and claims, percentages and parts are by weight unless otherwise indicated. Mesh sizes referred to herein are Tyler standard screen sizes which are defined in Chemical Engineer' Handbook, John H. Perry, Editor-in-Chief, Third Edition, 1950, published by McGraw-Hill Book Company, at page 963. For example, a 100 mesh screen opening corresponds to 147 microns, and 325 mesh to 44 microns.

What is claimed is:

1. A sodium silicate bonded, MgO-containing prepared refractory composition capable of being stored for at least 3 months without setting consisting essentially of: (1) from 84 to 94% refractory grain containing over 20% MgO, not over 10% of the composition being MgO in uncombined form, the remainder being present in prereacted chrome-periclase or periclase-chrome grain or chrome ore; (2) from 0.1 to 1%, on the $B_2O_3$ basis, of a water-soluble boron compound; (3) from 0.1 to 0.5% of an organic water retention agent; (4) from 1 to 5% sodium silicate; and (5) from 4 to 8% water; all percentages being by weight based on the total weight of the composition including water.

2. Plastic refractory according to claim 1 wherein the refractory grain is prereacted grain containing 60% MgO together with not over 10% periclase.

3. Plastic refractory according to claim 1 wherein the boron compound is a sodium borate.

4. Plastic refractory according to claim 3 wherein the sodium borate is borax.

5. Plastic refractory according to claim 1 wherein the boron compound is fully hydrated.

6. Plastic refractory according to claim 1 wherein the water retention agent is methyl cellulose.

7. Plastic refractory according to claim 1 wherein the sodium silicate contains two parts by weight $SiO_2$ for each part by weight $Na_2O$.

8. Plastic refractory according to claim 1 wherein the refractory grain is prereacted grain containing 60% MgO together with not over 10% periclase, the boron compound is borax, the water retention agent is methyl cellulose, and the sodium silicate contains two parts by weight $SiO_2$ for each part by weight $Na_2O$.

9. Plastic refractory according to claim 1 wherein the refractory grain is covered with an inner coating which is an admixture of the boron compound and the water retention agent, said inner coating being covered with an outer coating of the sodium silicate, the water being distributed in the two coatings.

10. Plastic refractory according to claim 9 wherein the refractory grain is prereacted grain containing 60% MgO together with not over 10% periclase, the boron compound is borax, the water retention agent is methyl cellulose, and the sodium silicate contains two parts by weight $SiO_2$ for each part by weight $Na_2O$.

11. Method of preparing a sodium silicate bonded, MgO-containing refractory composition comprising: (1) mixing together from 84 to 94% refractory grain containing over 20% MgO, not over 10% of the composition being MgO in uncombined form, the remainder being present in prereacted chrome-periclase or periclase-chrome grain or chrome ore, with from 0.1 to 1% on the $B_2O_3$ basis, of a water-soluble boron compound and from 0.1 to 0.5% of a water retention agent; (2) adding from 4 to 8% water to the admixture of step (1); (3) mixing until the mix has a stiff plastic consistency; (4) adding from 1 to 5% sodium silicate to the mix prepared in step (3); and (5) mixing until the batch becomes a wet granular mix; all percentages being by weight based on the total weight of the composition including water.

12. Method according to claim 11 wherein the mixing of step (1) is carried out for at least two minutes, the mixing of step (3) is carried out for about two minutes, and the mixing of step (5) is carried out for about three minutes.

13. Method according to claim 11 wherein the refractory grain is prereacted grain containing 60% MgO together with not over 10% periclase, the boron compound is borax, the water retention agent is methyl cellulose, and the sodium silicate contains two parts by weight $SiO_2$ for each part by weight $Na_2O$.

References Cited

UNITED STATES PATENTS

| | | | |
|---|---|---|---|
| 3,470,004 | 9/1969 | Begley et al. | 106—59 |
| 3,656,977 | 4/1972 | Dreyling et al. | 106—59 |
| 3,257,217 | 6/1966 | Van Dreser et al. | 106—59 |

JAMES E. POER, Primary Examiner

U.S. Cl. X.R.

106—81, 84